United States Patent
Taylor

(10) Patent No.: US 6,523,574 B1
(45) Date of Patent: Feb. 25, 2003

(54) INSERTION OF LINERS INTO HOST TUBULARS BY FLUID INJECTION

(75) Inventor: Jack Curtis Taylor, Conroe, TX (US)

(73) Assignee: Safetyliner Systems, LLC, Conroe, TX (US)

( * ) Notice: Subject to any disclaimer, the term of this patent is extended or adjusted under 35 U.S.C. 154(b) by 0 days.

(21) Appl. No.: 09/744,700

(22) PCT Filed: Jul. 29, 1999

(86) PCT No.: PCT/US99/17401
§ 371 (c)(1),
(2), (4) Date: Mar. 19, 2001

(87) PCT Pub. No.: WO00/06338
PCT Pub. Date: Feb. 10, 2000

Related U.S. Application Data

(60) Provisional application No. 60/094,585, filed on Jul. 29, 1998.

(51) Int. Cl.$^7$ .................................................. F16L 55/16
(52) U.S. Cl. ............................................ 138/98; 138/97
(58) Field of Search ........................................ 138/97, 98

(56) References Cited

U.S. PATENT DOCUMENTS

| | | |
|---|---|---|
| 1,304,036 A | 5/1919 | Eshelby |
| 1,930,285 A | 10/1933 | Robinson |
| 2,440,245 A | 4/1948 | Chevigny ............... 250/27.5 |
| 2,794,758 A * | 6/1957 | Harper et al. ............. 138/98 |
| 3,184,958 A | 5/1965 | Eaton ...................... 73/40.5 |
| 3,299,417 A | 1/1967 | Sibthorpe ................ 340/242 |
| 3,339,415 A | 9/1967 | Wild ....................... 73/40.5 |
| 3,554,493 A | 1/1971 | Bowden et al. |
| 3,581,776 A | 6/1971 | Sheahan ................. 138/108 |
| 3,626,987 A | 12/1971 | Bittner .................... 138/114 |
| 3,907,336 A | 9/1975 | Siegmund ................. 285/93 |
| 3,933,182 A | 1/1976 | Costes .................... 138/149 |
| 4,185,809 A | 1/1980 | Jonnes |
| 4,220,179 A | 9/1980 | Scheffler et al. ............ 138/113 |
| 4,274,549 A | 6/1981 | Germain ................. 220/86 R |
| 4,321,110 A | 3/1982 | Nickel et al. ............... 376/250 |
| 4,332,170 A | 6/1982 | Belval et al. ............ 73/40.5 R |
| 4,386,269 A | 5/1983 | Murphy .................... 250/227 |
| 4,446,891 A * | 5/1984 | Gebelius .................... 138/97 |
| 4,450,711 A | 5/1984 | Claude .................... 73/40.5 R |
| 4,529,009 A | 7/1985 | Horner et al. ............. 138/111 |

(List continued on next page.)

FOREIGN PATENT DOCUMENTS

| | | |
|---|---|---|
| DE | 2706069 | 8/1978 |
| EP | 0337674 | 10/1989 |
| GB | 2262321 | 6/1993 |
| WO | 9012241 | 10/1990 |

OTHER PUBLICATIONS

Newman, et al., "Development of a Coiled Tubing Cable Installation System," Society of Petroleum Engineers. Inc. (1995).

U.S. patent application Ser. No. 09/077,236 filed May 26, 1998, allowed.

Primary Examiner—James Hook
(74) Attorney, Agent, or Firm—Ostrolenk, Faber, Gerb & Soffen LLP

(57) ABSTRACT

A method of inserting a liner (10) into a host tubular (60), in which the liner is deformed to reduce its cross-sectional dimensions; the deformed liner is fed into the host tubular in a downstream direction; and a fluid is injected under pressure into the host tubular to urge the liner in the downstream direction, while the fluid pressure maintains the deformation of the liner. The liner is advantageously deformed by at least one set of rollers (22, 23, 24) into an unstable cross-sectional shape which has at least three axes of symmetry and which spontaneously expands into contact with the host tubular unless held by the pressure of the injected fluid. The injected fluid applies a shear force to the liner in the downstream direction which is substantially uniform along the length of the liner.

26 Claims, 6 Drawing Sheets

U.S. PATENT DOCUMENTS

| | | | |
|---|---|---|---|
| 4,554,650 A | 11/1985 | Brown et al. .............. 367/154 |
| 4,644,780 A | 2/1987 | Jeter ...................... 73/40.5 R |
| 4,651,893 A | 3/1987 | Mooney ................... 220/445 |
| 4,667,505 A | 5/1987 | Sharp ..................... 73/40.5 R |
| 4,676,563 A | 6/1987 | Curlett et al. .............. 439/194 |
| 4,683,944 A | 8/1987 | Curlett ..................... 166/65.1 |
| 4,693,279 A | 9/1987 | Aubert ..................... 138/108 |
| 4,700,751 A | 10/1987 | Fedrick .................... 138/149 |
| 4,756,339 A | 7/1988 | Buluschek ................. 138/115 |
| 4,804,020 A | 2/1989 | Bartholomew ............. 138/111 |
| 4,805,444 A | 2/1989 | Webb ...................... 73/40.5 R |
| 4,836,305 A | 6/1989 | Curlett ..................... 175/215 |
| 4,867,921 A * | 9/1989 | Steketee, Jr. ................ 138/97 |
| 4,920,786 A | 5/1990 | Danielson .................. 73/49.2 |
| 4,924,949 A | 5/1990 | Curlett ..................... 175/25 |
| 4,932,257 A | 6/1990 | Webb ...................... 73/40.5 R |
| 4,965,036 A | 10/1990 | Miyazaki et al. ........... 264/269 |
| 4,985,196 A | 1/1991 | LeDoux et al. |
| 4,986,951 A * | 1/1991 | Ledoux et al. .............. 138/97 |
| 5,034,180 A | 7/1991 | Steketee, Jr. |
| 5,040,408 A | 8/1991 | Webb ...................... 73/40.5 R |
| 5,060,509 A | 10/1991 | Webb ...................... 73/40.5 R |
| 5,091,137 A * | 2/1992 | Ledoux ..................... 138/97 |
| 5,172,730 A | 12/1992 | Driver ...................... 138/104 |
| 5,222,769 A | 6/1993 | Kaempen ................... 285/45 |
| 5,305,798 A | 4/1994 | Driver ...................... 138/98 |
| 5,308,041 A | 5/1994 | Griffioen et al. |
| 5,327,945 A | 7/1994 | Simpson et al. ............. 141/59 |
| 5,327,949 A | 7/1994 | Dotson et al. .............. 141/206 |
| 5,333,490 A | 8/1994 | Webb ...................... 73/40.5 R |
| 5,335,872 A | 8/1994 | Clubbs ..................... 242/610.6 |
| 5,342,570 A | 8/1994 | LeDoux et al. |
| 5,343,738 A | 9/1994 | Skaggs ..................... 73/40.5 R |
| 5,395,472 A | 3/1995 | Mandich |
| 5,409,561 A | 4/1995 | Wood ....................... 156/287 |
| 5,447,665 A * | 9/1995 | Steketee, Jr. ................ 138/97 |
| 5,454,419 A | 10/1995 | Vloedman .................. 166/277 |
| 5,469,891 A | 11/1995 | Lund et al. ................. 138/98 |
| 5,490,419 A | 2/1996 | Webb ...................... 73/40.5 R |
| 5,497,809 A | 3/1996 | Wolf ........................ 138/113 |
| 5,546,992 A | 8/1996 | Chick et al. ................ 138/98 |
| 5,551,484 A | 9/1996 | Charboneau ............... 138/104 |
| 5,611,373 A | 3/1997 | Ashcraft ................... 138/113 |
| 5,743,299 A | 4/1998 | Chick et al. ................ 138/98 |
| 5,778,938 A | 7/1998 | Chick et al. ................ 138/98 |
| 5,794,663 A * | 8/1998 | Kiest, Jr. et al. ............. 138/97 |
| 5,810,053 A * | 9/1998 | Mandich .................... 138/98 |
| 5,831,149 A | 11/1998 | Webb ...................... 73/40.5 R |
| 5,861,116 A | 1/1999 | Mandich |
| 5,884,384 A | 3/1999 | Griffioen |
| 5,934,332 A * | 8/1999 | Rodriguez et al. ........... 138/98 |
| 6,021,815 A * | 2/2000 | Kiest, Jr. et al. ............ 138/98 |
| 6,024,910 A * | 2/2000 | Kamiyama et al. .......... 138/98 |

\* cited by examiner

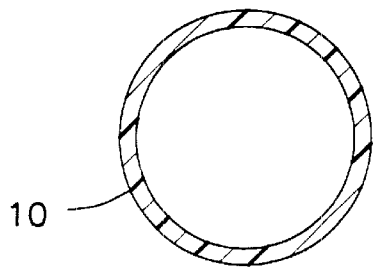
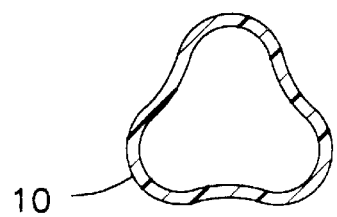
Fig. 3b          Fig. 3c
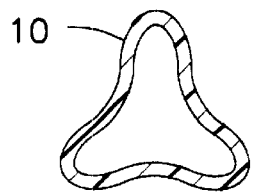
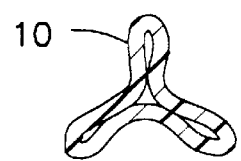
Fig. 3d          Fig. 3e
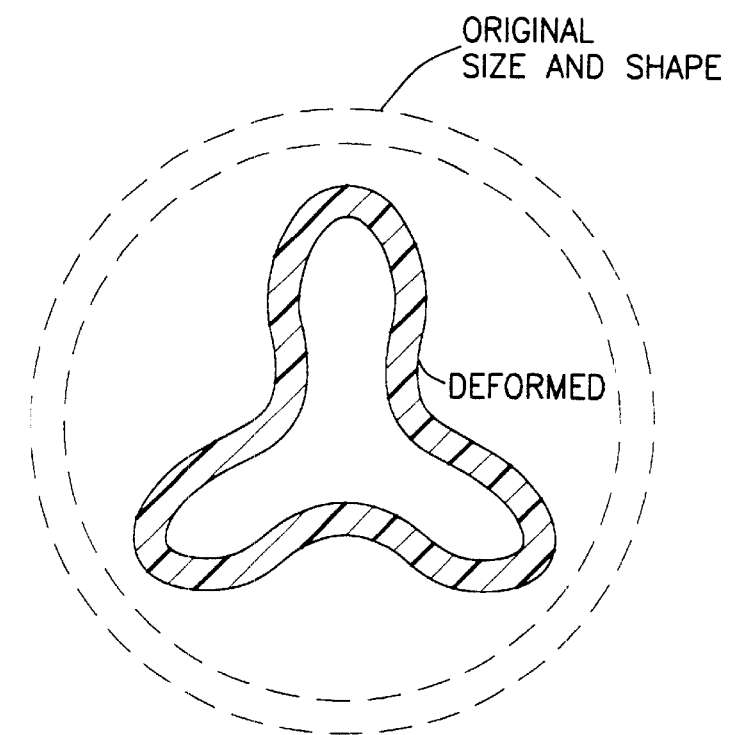
Fig. 4a

INSERTION OF LINERS INTO HOST TUBULARS BY FLUID INJECTION

CROSS-REFERENCE TO RELATED APPLICATIONS

This application is based on and claims priority from U.S. provisional patent application 60/094,585 filed Jul. 29, 1998, in the name of Jack C. Taylor.

This application is related to Ser. No. 08/532,561 filed Jun. 4, 1990, now U.S. Pat. No. 5,072,622; and the following provisional applications, all filed in the name of Jack C. Taylor: Ser. No. 60/093,665 filed Jul. 22, 1998 and its corresponding PCT Int'l. Appln. No. PCT/US99/16612 filed Jul. 22, 1999; Ser. No. 60/094,326 filed Jul. 28, 1998 and its corresponding PCT Int'l. Appln. No. PCT/US99/16968 filed Jul. 28, 1999; and Ser. No. 60/138,814 filed Jun. 14, 1999.

Some, but not all, of the aspects of the invention described herein have been filed under the USPTO Document Disclosure program by Jack C. Taylor under reference number 424712 (Sep. 18, 1997).

The foregoing disclosures are incorporated by reference herein.

BACKGROUND OF THE INVENTION

Pipe and other tubulars have been lined with tubular polymeric liners, e.g., polyethylene, nylon 11, etc., for many years. These systems have been used principally in offshore and onshore pipelines, and in downhole production tubulars. Generally, the liner resides in close-tolerance with the host pipe along its length, forming a stable composite system. See FIG. 1, which is a cutaway end view of a lined tubular.

Several installation techniques are known to the art. However, they have all relied upon one of two methods to insert the liner into the host tubular; either pulling or pushing from one end or the other. Typically, to pull liners in, a cable is used, or if in the vertical direction, weights in conjunction with gravity have been employed to the same effect. In pushing methods, usually a four-step cycle is used upon the liner, consisting of the steps of clamp-push-release-reposition.

Under the current art, the maximum length of an individual installation segment has been limited by the mechanical properties of the liner in concert with the friction drag accumulated during the insertion process.

For example, for polyethylene liners installed in diameter-reduced fashion, e.g., the known Titeliner™ and Swageliner™ systems and the like, installation lengths tend to average 2500 feet, and the maximum permissible length is approximately 5000 feet. Tensile loads, borne totally by the liner, continually climb throughout the insertion process, in proportion to distance pulled, with all the force being directed through the leading end of the liner. As a result, when longer lengths are attempted, the liner simply pulls apart.

In pushing methods, the practical lengths tend to be even shorter. The relatively flexible liners quickly assume an 'S-curve' within the host due to the pushing. The resultant friction against the host wall is thus amplified, and the process simply stalls.

Generally, in either case, bends in the host pipe substantially diminish achievable insertion length. Drag between the liner and the host pipe increases dramatically due to bends that the liner passes. The increase in lateral pressure due to a bend increases the total friction between the two elements. Lining of reeled pipe is virtually impossible, since all segments that are to be lined must be relatively straight for best effect.

SUMMARY OF THE INVENTION

The invention relates to a method of injecting liners into host tubulars. Fluid is pumped into the host pipe concurrent with introduction of the liner. The momentum and drag imparted by the fluid to the liner induces axial motion of the liner for insertion into the tubular. Also, the pressure of the fluid in the host maintains the liner in a reduced cross-section throughout the insertion process, minimizing drag.

The invention extends the maximum installation length. It facilitates the ability to insert a liner over long distances, into those lines where sectioning into short distances is impractical, or impossible; e.g., water crossings and restricted rights-of-way. It can also be used to install liner into reeled pipe as well as straight pipe. These benefits translate directly to lower project costs. Fewer insertion operations are necessary for any in-situ rehabilitation project where the line is multiply sectioned, resulting in reduced time, hardware and overall cost. The invention also permits lining of new host tubulars at a plant-site for improved logistics and quality control. A final benefit of the method is that less longitudinal stress is imparted on the liner, minimizing failure potential and thus enabling longer service life.

The method is equally suitable to both pipeline, i.e., essentially horizontal, and downhole, i.e., essentially vertical, applications.

Other features and advantages of the invention will become apparent from the following detailed description, in conjunction with the drawings.

BRIEF DESCRIPTION OF THE DRAWINGS

FIGS. 3b–3e are cross-sectional views of a liner showing successive stages in the process of deforming the liner.

FIGS. 4a–4g are cross-sectional views illustrating various configurations of a liner after deformation.

DETAILED DESCRIPTION OF EMBODIMENTS OF THE INVENTION

The liner to be installed is approximately the same length as, or up to 5% longer than, the host tubular. The initial liner configuration may vary. It may be extruded in one piece on a reel, it may consist of multiple reels joined by fusion techniques known to the art, or, it may consist of multiple joints similarly joined and either reeled or extensively laid out.

The liner enters the installation equipment without substantial pre-existing axial longitudinal tensile stress (unlike in known pulling methods). A minimal starting load minimizes the axial force that the flowing fluid must impart on the liner for insertion.

Figure 1:
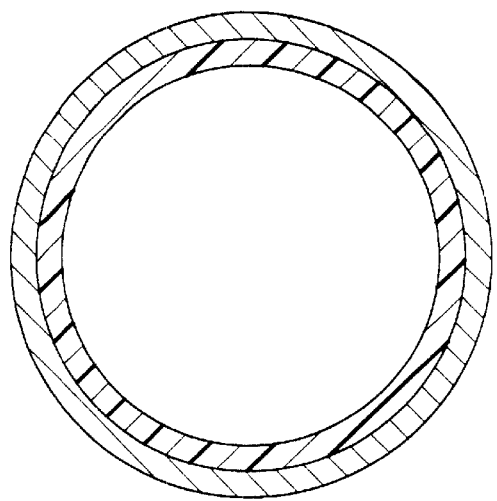
FIG. 1 is a cross-sectional view of a conventional lined tubular.
Figure 2:
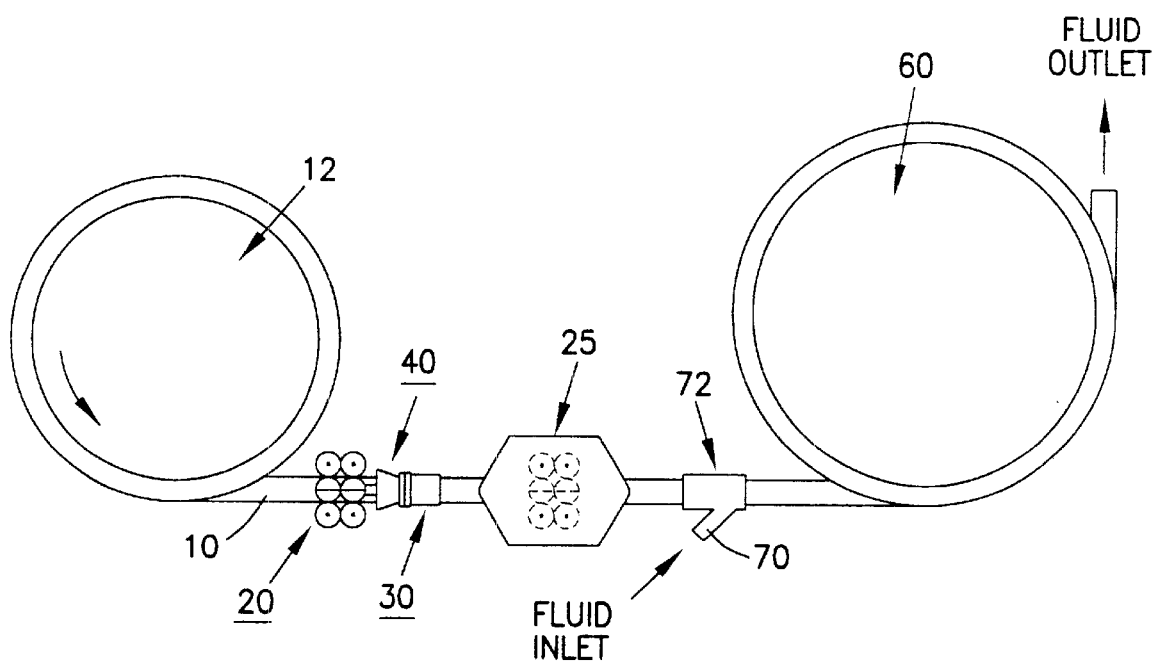
FIG. 2 is a schematic diagram of an apparatus for carrying out a method according to an embodiment of the invention.
Figure 3A:
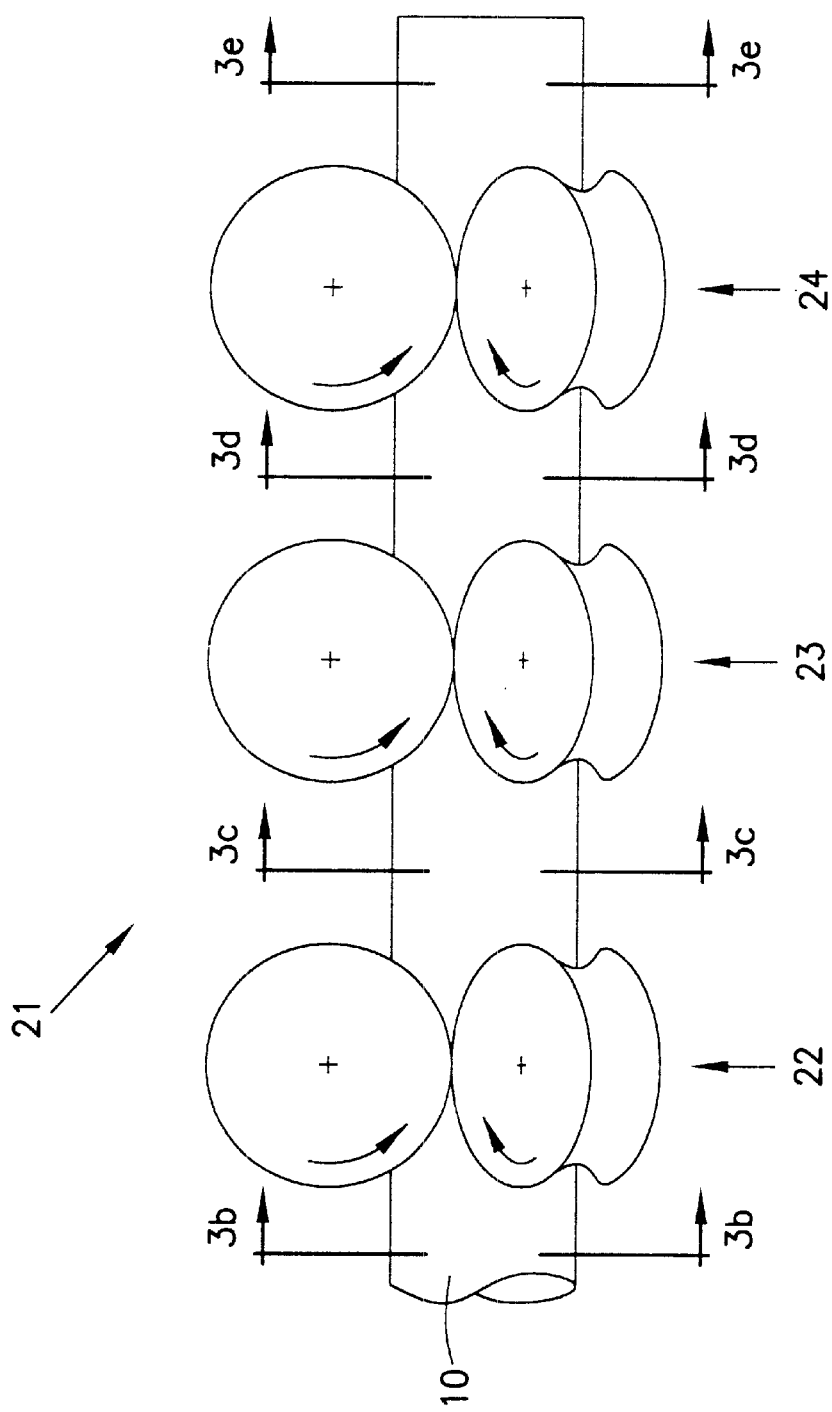
FIG. 3a is an isometric view of a deforming apparatus comprising three sets of rollers.

In one embodiment, shown in FIG. 2, the liner 10 is on a reel 12 adjacent to the installation point (the packing gland/lubricator unit 30). The reel is powered or free-wheeling. In another embodiment (not shown), the liner can be laid out, and the entire length drawn through a roller or tractor system prior to insertion.

The liner is then fed into a deforming apparatus 20, which reduces its cross-sectional area, the effective diameter, and correspondingly its moment of inertia. The deforming apparatus may be constructed of one or a plurality of concentric roller sets in series. In the embodiment disclosed in FIG. 3a, the deforming apparatus 21 comprises three sets of rollers 22, 23, 24, each set comprising three rollers. FIGS. 3b–3e are sketches showing evolutionary deformation of the liner 10 via this roller type apparatus 21. FIGS. 3b, 3c, 3d, and 3e are cross-sectional views of the liner 10 taken respectively along section lines 1—1, 2—2, 3—3 and 44 in FIG. 3a.

Alternatively, other liner deformation methods may be employed to effect the invention (not illustrated). For example, a series of one or more dies may be used, with or without an optional tractor feed mechanism 25, known in the art of extrusion as a "haul-off." Or, hydraulic-type presses, similar to a haul-off, may be used to simultaneously, or sequentially, radially deform and longitudinally push the liner. Notwithstanding, a combination of any of these mechanisms may be used. The deforming apparatus may also incorporate a surface finish to roughen the surface of the liner, which is of benefit in enhancement of the movement of the liner, as described below.

The deforming apparatus 20 also provides sufficient pushing force to inject the liner through the packing gland/lubricator unit 30, described below The pushing force is sufficient to overcome fluid pressure downstream of the packing gland 30, which may exert considerable pressure upon the liner in an attempt to prevent its entry, pushing it back.

The form of the liner, after passing through the deforming apparatus, may vary. In addition to the form shown in FIG. 3e. FIGS. 4a–4g show end cutaway views of a subset of alternative liner deformation shapes. The profile of the liner preferably has three or more equilateral arms, symmetrical in shape about at least three axes of symmetry, with a minimal central gap, such that the diameter of the liner is reduced at least to about 70% of its original size. A four arm profile (FIG. 4b) generally provides for ease of design and construction of apparatus. A five arm profile (FIG. 4c) is believed to be optimum for effective diameter reduction purposes; the diameter is thereby reduced to 45% of the liner's original diameter, and further, the apparatus is not highly complex. Additionally, configurations with more arms may be used.

Figure 4B:
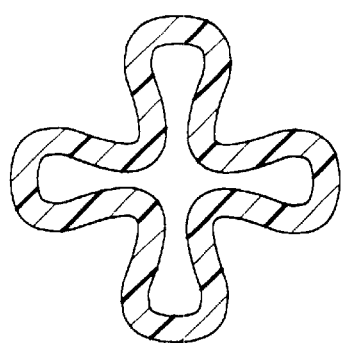
Figure 4E:
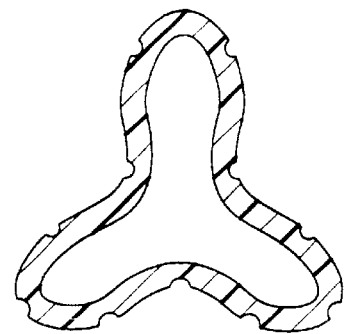
Figure 4C:
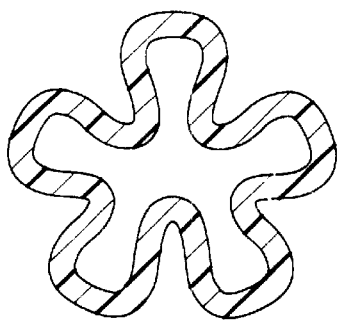
Figure 4F:
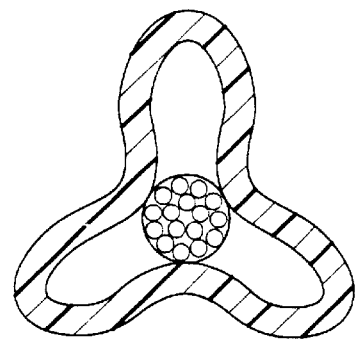
Figure 4D:
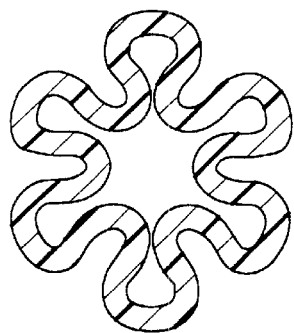
Figure 4G:
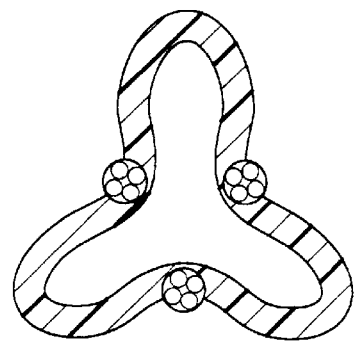

The liner may incorporate one or more channels in its surface (FIG. 4e). The geometry of the channels may be designed to minimize deformation stresses, or assist in liner alignment with insertion equipment. It may also incorporate one or more longitudinal members such as cables or springs (see FIGS. 4f–4g). Such members, in accord with liner geometry, may also be designed to minimize deformation stresses and improve insertion alignment. Such liners are disclosed in the corresponding patent disclosures referred to above.

The temporarily reshaped liner 10 exiting the deforming apparatus 20 will have a tendency to revert to its original tubular shape. In one embodiment, shown in FIG. 5, this can be controlled by sending said liner through a guide 40 located between the deforming apparatus 20 and the packing gland/lubricator unit 30, the guide 40 being profiled to limit the expansion of the liner. The guide 40 also acts to prevent the liner from axial buckling as it is being pushed into the packing gland 54, as the compressive stress on the liner element between the apparatus and the gland are considerable. The guide 40 provides such reinforcement. The guide may be lubricated to minimize friction with the liner therein. The guide may not be required in all instances, however, particularly when relatively low fluid pressures are required for the method.

The liner need not be deformed immediately prior to insertion. Rather, it may be deformed in advance and stored until the time for insertion, provided that other means are provided for retaining the desired deformed profiles. Many such means of geometry profile retention are known to the art, including but not limited to: maintaining a vacuum in the liner's interior, overwrapping, post-extrusion memory setting, and reeling the liner in appropriate lay-up patterns.

Figure 5:
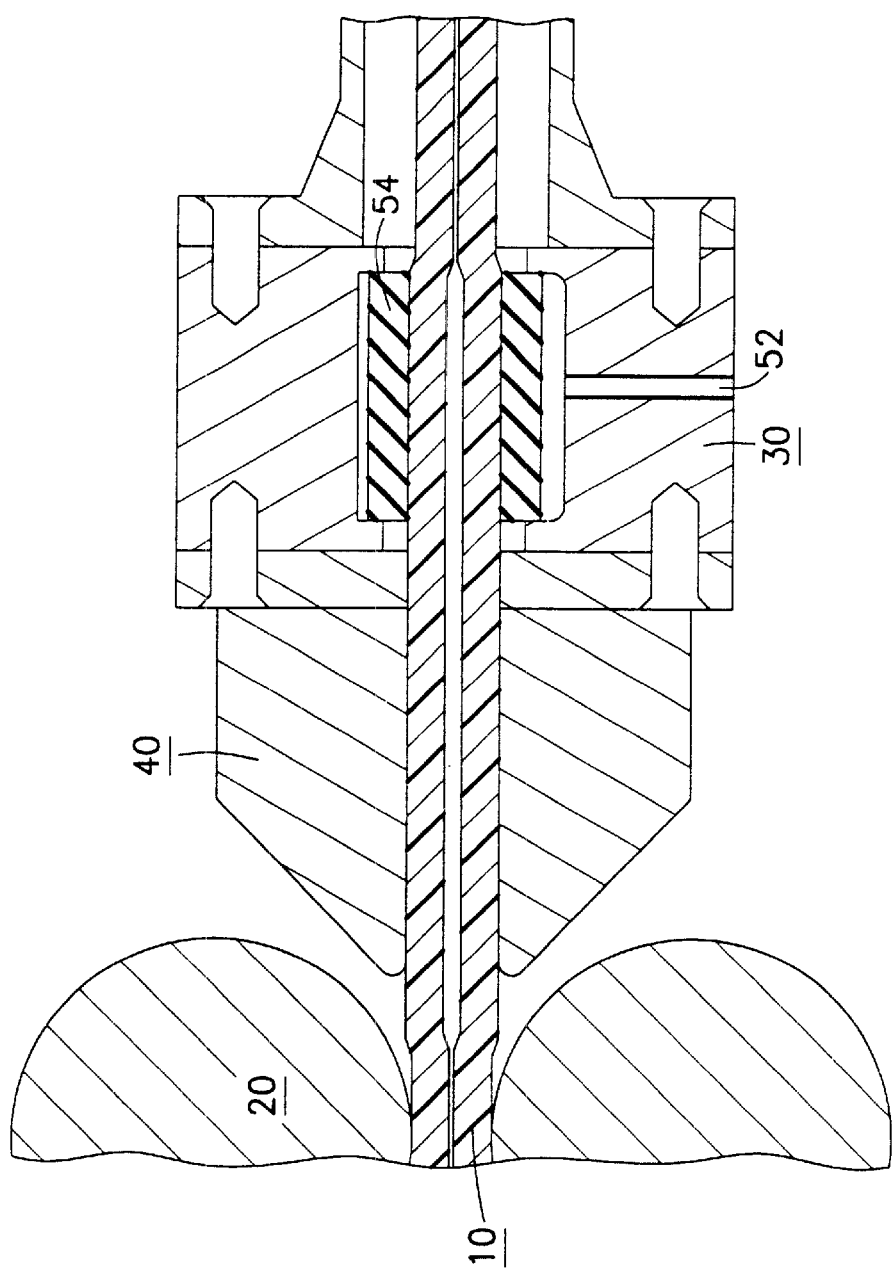
FIG. 5 is an enlarged cross-sectional view of a packing gland/lubricator unit.

The packing gland/lubricator unit 30, shown in detail in FIG. 5, has a lubrication port 52, and a rubber or elastomeric packing gland 54 which prevents excess fluid from egressing the injection apparatus and the host tubular. Its principles are known in the art of wireline and steel coiled tubing in the oil production industry. The packing gland 54 defines a transverse area whose shape matches that of the deformed liner 10, in order to accommodate and restrain the deformed liner as it enters the injection apparatus area.

In the embodiment of FIG. 2, another drive mechanism 25 is located downstream of the packing gland unit 30 within the fully pressurized area, and is used to assist the liner 10 through the packing gland 54, and onward through the host tubular 60. Although not always necessary, particularly at relatively low fluid pressures, this drive unit 25 endeavors to minimize drag which exists in the deformed liner 10 as it enters the pressurized area. Such a drive mechanism 25 may consist of opposed rollers, and/or a tractor feed.

Downstream of the packing gland/lubricator unit 30, fluid is injected into a feeder tube 70, which is itself upstream of the host tubular 60 to be lined. In a preferred embodiment, the feeder tube/fluid inlet 70 is one branch of a wye fitting 72 (FIG. 2). As the liner 10 crosses the path of the fluid entering the feeder tube, the friction of the fluid and its momentum in the downstream direction (toward the right in FIG. 2) is imparted upon the liner in a shear reaction. The net result is an effective tensile stress which propels the liner downstream.

The deformed liner, within the area of pressurized fluid, is maintained in its deformed shape by external pressure applied by the fluid, said pressure being typically hundreds to thousands of pounds per square inch. As long as this pressure remains, the liner will not revert radially outward, towards its original shape.

The present invention is clearly differentiated from the pull methods referred to above, on the basis of stress distribution. In a pull method the tensile force required to overcome drag is applied at the front of the liner only. This area experiences maximum stress, and the stress within the body of the liner diminishes incrementally towards the tailing end of the liner.

Conversely, in the present invention the flow of the fluid applies the necessary force over the entire length of the liner's exterior surface through shear principles. Every element of the liner experiences a virtually equivalent axial stress. Further, since the stress is induced by shear relative to the fluid in motion, the effective stress level experienced is much less than that required to cause material damage. The liner experiences much less axial strain than that seen in pull methods, where the typical elongation is greater than 5%.

The combination of the fluid dynamics and imparted shear stress facilitates the motion of the liner. The liner is essentially flushed downstream through the tubular. This effect may be facilitated when the liner has a specific gravity near that of the fluid, e.g., polyethylene and water, so that close to neutral buoyancy exists. The liner effectively floats within the fluid stream, mitigating frictional drag between the liner and the host pipe. The liner is essentially in dynamic suspension.

The directional shear stress imparted to the liner in order to cause motion is determined by many elements, including: liner material properties, e.g., roughness, density, etc.; fluid material properties, e.g., viscosity, density, lubricity, etc.; and, fluid flow properties, e.g., velocity, turbulence, etc. These properties may be considered beforehand, or, manipulated during insertion, as appropriate, in order to best effect the onset and continuity of liner motion to a greater degree.

As the liner is being propelled by the incremental skin friction effect described above, there is minimal axial stressing induced. The theoretical length of installation is not limited by the applied tensile stress, unlike in pull methods. In a practical sense, however, insertion length limitations do exist, and are governed by fluid flow properties in conjunction with the maximum hoop stress capacity of the host tubular.

A fluid velocity, typically of greater than 5 ft./sec., is believed to be advantageous to maintain liner motion. However, significant pressure is required to maintain this velocity within a long host tubular, and particularly as the liner progresses further within. The reason is that the cross sectional area available for fluid flow is reduced in that section of the host tubular containing the deformed liner. Rather than a full tube, only an annulus exists, and the reduced area increases unit head loss. Keeping within the working limits of the host tubular, a maximum pressure allowance is eventually reached at some finite distance of liner insertion. This distance is also a function of several factors: host tubular properties, e.g., cross-sectional area, pressure rating, inner surface roughness, etc., fluid properties, e.g., constituency, temperature, etc.; and, liner properties, e.g., surface roughness, cross sectional area, etc. Notwithstanding, it can be demonstrated that up to 15,000 ft. of liner may be installed in a host tubular.

As the liner is in a state of dynamic suspension in the host tubular, the host tubular need not be straight for the method to work. In one embodiment the host tubular is a reeled steel pipeline. As long as the resultant stress of the liner in motion overcomes any bending stress, and maintains the liner within the curvature of the host tubular, the liner will continue to flow without binding due to frictional drag against the outer wall. As above, several factors govern the functionality, including: host pipe, e.g., diameter, bending radius, ovality, inner surface roughness, etc.; fluid, e.g., viscosity, velocity, temperature, etc.; and, liner, e.g., temperature, shape, stiffness, effective moment of inertia, etc. Notwithstanding, it can be demonstrated that the method is applicable to reeled steel pipe bent in radii in accord with industry practice.

When the liner reaches and then exits the downstream end of the host tubular, fluid flow is halted. The liner will attempt to revert to its original tubular shape. However, it will generally be unable to do so without assistance. The locked-in stresses from deformation sometimes prevent spontaneous reversion. And, if the liner has been sized to a close-tolerance fit with the inside of the host tubular, the geometry will not allow spontaneous reversion. Accordingly, the liner must usually be forcefully expanded to assume its desired final configuration, in close tolerance. See FIGS. 6a–6c which are cutaway elevation views showing an example of the reversion process. This may be readily effected by a simple series of steps. An end termination, known to the art, is applied to an end of the host tubular and liner. The system is pressurized, preferably using a pig, also known to the art, to sequentially induce the reversion from one end to the other.

A pig is not always necessary, however, if means are provided for fully evacuating the fluid from the annulus should the liner revert irregularly. In such a case, a downstream segment of the liner may revert prior to an upstream segment, effectively trapping the annular fluid between those two segments. In one embodiment of the invention, therefore, the liner may have one or more channels disposed in its outer surface to facilitate the evacuation of the fluid without a pigging device.

The reversion process also does not impart any significant degree of axial strain to the liner. Thus the residual stress configuration of the liner is optimized for long-term performance in this respect.

The final step in the process is the termination of the final end, once again accomplished within known art.

The liner materials that can be used in the invention are various. They may be thermoplastic tubulars, as chiefly discussed herein, or they may be others, e.g., woven fiber, thermosets, metallic, composites, etc. Each type is installable with the principles set forth above, and accordingly are within the scope of the invention.

Figure 6A:
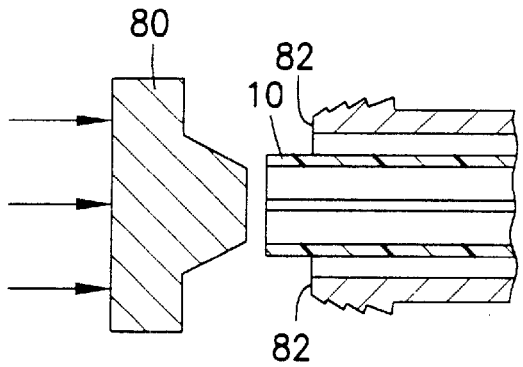
FIGS. 6a–6c are cross-sectional views showing various stages in the process of capping a host tubular and expanding the liner to its original shape.
Figure 6B:
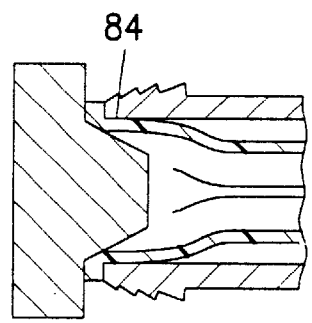
Figure 6C:
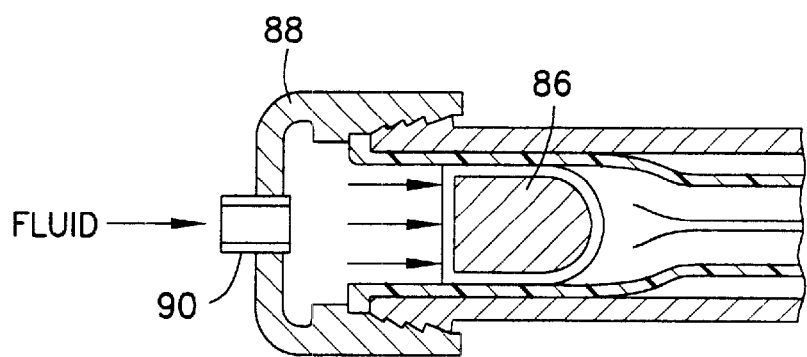

By illustration, a thermoplastic liner and associated equipment in FIGS. 6a–6c provides for one means of completing the process towards a functional lined tubular system.

As seen in FIG. 6a, a conically shaped flaring tool 80 is inserted in one end of the still-deformed liner 10. The flaring tool 80 is pre-heated to soften the thermoplastic liner material and reform its shape so that the ends 82 of the host tubular are covered and the liner immediately interior to the end effectively engages the inner surface of the host pipe at 84 (FIG. 6b). The flaring tool is then removed, and the liner is allowed to coot to its new stable shape.

Referring now to FIG. 6c, a pig 86 is then inserted into the liner and an end cap 88 put on subsequently. The end cap is designed to seal the annulus and the environment from the bore of the system. Further the end cap is provided with a port 90 for fluid injection to the bore, which is used to push the pig.

The pig 86 is pushed through the liner, reverting it back to its original shape incrementally as it passes along the line. In the case of a tight fitting liner, this action effectively displaces any annular fluids introduced during the insertion process, causing them to egress from the distant end. The liner thus regains its original, stable shape within host tubular.

After the pig has passed completely through the lined tubular, the aforementioned flaring process can be repeated at the distant end in order to complete the system.

A pig, as illustrated, is not always necessary to perform the reversion process, as pressurization of the internal bore will accomplish this. However, this method may not be as effective without a pig, as annular fluid may become trapped if the reversion process is not incremental, and thus the evacuation rate of the fluid may be greatly reduced or halted.

In the case of an externally channelled liner, fluids may remain, by virtue of the geometry. It may be desirable to fully clear the annulus of remaining fluid. This may be done fairly readily, by purging the annulus with a gas through ports in the side of the host pipe, not illustrated.

Although embodiments of the invention have been described herein, the invention is not so limited, but extends to all modifications and variations that may occur to one having the ordinary level of skill in the art.

What is claimed is:

1. A method of inserting a liner into a host tubular, comprising the steps of:
    deforming said liner into a deformed condition in which its cross-sectional dimensions are reduced;
    feeding said deformed liner into said host tubular in a downstream direction; and
    injecting a fluid under pressure into said host tubular so as to maintain said liner in said deformed condition substantially only by said pressure of said injected fluid, while urging said liner in said downstream direction while said liner is in said deformed condition.

2. The method of claim 1, wherein said fluid applies a shear force to said liner in said downstream direction which is substantially uniform along the length of said liner.

3. The method of claim 1, wherein said fluid is a liquid.

4. A method of inserting a liner into a host tubular, comprising the steps of:
    deforming said liner into a deformed condition in which its cross-sectional dimensions are reduced;
    feeding said deformed liner into said host tubular in a downstream direction; and
    injecting a fluid under pressure into said host tubular, while urging said liner in said downstream direction while said liner is in said deformed condition,
    wherein said liner is deformed into an unstable cross-sectional shape which has at least three axes of symmetry and which spontaneously expands outward toward said host tubular unless held in said deformed condition.

5. The method of claim 4, wherein said symmetrical shape has three vertices.

6. The method of claim 4, wherein said symmetrical shape has four vertices.

7. The method of claim 4, wherein said symmetrical shape has five vertices.

8. The method of claim 4, wherein said symmetrical shape has six vertices.

9. A method of inserting a liner into a host tubular, comprising the steps of:
    deforming said liner into a deformed condition in which its cross-sectional dimensions are reduced;
    feeding said deformed liner into said host tubular in a downstream direction; and
    injecting a fluid under pressure into said host tubular, while urging said liner in said downstream direction while said liner is in said deformed condition,
    further comprising the step of adhering an elongated member to said liner for being fed along with said liner in order to form a fluid communication path between said liner and said host tubular.

10. A method of inserting a liner into a host tubular, comprising the steps of:
    deforming said liner into a deformed condition in which its cross-sectional dimensions are reduced;
    feeding said deformed liner into said host tubular in a downstream direction; and
    injecting a fluid under pressure into said host tubular, while urging said liner in said downstream direction while said liner is in said deformed condition,
    further comprising the step of adhering an elongated member to said liner for facilitating said step of feeding said liner into said host tubular.

11. The method of claim 10, wherein said elongated member is adhered to said liner along the length of said liner.

12. A method of inserting a liner into a host tubular, comprising the steps of:
    deforming said liner into a deformed condition in which its cross-sectional dimensions are reduced;
    wherein said liner is deformed into an unstable cross-sectional shape which has at least three axes of symmetry and which spontaneously expands outward toward said host tubular unless held in said deformed condition;
    feeding said deformed liner into said host tubular in a downstream direction; and
    injecting a fluid under pressure into said host tubular to urge said liner in said downstream direction while said liner is in said deformed condition.

13. The method of claim 12, wherein said symmetrical shape has three vertices.

14. The method of claim 12, wherein said symmetrical shape has four vertices.

15. The method of claim 12, wherein said symmetrical shape has five vertices.

16. The method of claim 12, wherein said symmetrical shape has six vertices.

17. The method of claim 12, wherein said fluid applies a shear force to said liner in said downstream direction which is substantially uniform along the length of said liner.

18. The method of claim 12, further comprising the step of adhering an elongated member to said liner for being fed along with said liner in order to form a fluid communication path between said liner and said host tubular.

19. The method of claim 12, further comprising the step of adhering an elongated member to said liner for facilitating said step of feeding said liner into said host tubular.

20. The method of claim 12, wherein said fluid is a liquid.

21. A method of inserting a liner into a host tubular, comprising the steps of:
    deforming said liner into a deformed condition in which its cross-sectional dimensions are reduced;
    adhering an elongated member to said liner;
    feeding said deformed liner and said elongated member into said host tubular in a downstream direction; and
    injecting a fluid under pressure into said host tubular to urge said liner in said downstream direction while said liner is in said deformed condition;
    wherein said elongated member forms a fluid communication path between said liner and said host tubular.

22. The method of claim 21, wherein said fluid applies a shear force to said liner in said downstream direction which is substantially uniform along the length of said liner.

23. The method of claim 21, wherein said fluid is a liquid.

24. A method of inserting a liner into a host tubular, comprising the steps of:
    deforming said liner into a deformed condition in which its cross-sectional dimensions are reduced;
    adhering an elongated member to said liner;
    feeding said deformed liner and said elongated member into said host tubular in a downstream direction; and
    injecting a fluid under pressure into said host tubular to urge said liner in said downstream direction while said liner is in said deformed condition;
    wherein said elongated member facilitates said step of feeding said liner into said host tubular.

25. The method of claim 24, wherein said fluid applies a shear force to said liner in said downstream direction which is substantially uniform along the length of said liner.

26. The method of claim 24, wherein said fluid is a liquid.

* * * * *